United States Patent [19]

Samuels

[11] Patent Number: 6,051,164
[45] Date of Patent: Apr. 18, 2000

[54] METHODS AND COMPOSITIONS FOR PROTECTING POLYMERS FROM UV LIGHT

[75] Inventor: Sari-Beth Samuels, Mahwah, N.J.

[73] Assignee: Cytec Technology Corp., Stamford, Conn.

[21] Appl. No.: 09/070,627

[22] Filed: Apr. 30, 1998

[51] Int. Cl.$^7$ .................................................. C09K 15/08
[52] U.S. Cl. ............................ 252/404; 252/403; 524/87; 524/89; 524/91; 524/92; 544/211; 544/215; 564/225; 564/244; 564/246; 564/247
[58] Field of Search .................................. 252/404, 403; 524/87, 89, 91, 92; 544/211, 215, 225; 564/244, 246, 247

[56] References Cited

U.S. PATENT DOCUMENTS

| | | | |
|---|---|---|---|
| 3,896,125 | 7/1975 | Helmo et al. | 544/211 |
| 4,331,586 | 5/1982 | Hardy | 525/186 |
| 4,467,061 | 8/1984 | Yamamoto et al. | 524/87 |
| 4,619,956 | 10/1986 | Susi | 524/87 |
| 5,190,710 | 3/1993 | Kletecka | 264/78 |
| 5,244,947 | 9/1993 | Nohr et al. | 524/91 |
| 5,714,530 | 2/1998 | Waterman et al. | 524/87 |
| 5,721,298 | 2/1998 | Waterman | 524/100 |

FOREIGN PATENT DOCUMENTS

| | | |
|---|---|---|
| 0 180 992 B1 | 7/1990 | European Pat. Off. . |
| 0 501 239 A1 | 9/1992 | European Pat. Off. . |
| 0 299 426 B1 | 3/1994 | European Pat. Off. . |
| 0 453 396 | 12/1995 | European Pat. Off. . |
| 0 704 560 A1 | 4/1996 | European Pat. Off. . |
| 0 505 775 B1 | 9/1996 | European Pat. Off. . |
| 0 483 488 B1 | 3/1997 | European Pat. Off. . |

*Primary Examiner*—Terressa M. Boykin
*Attorney, Agent, or Firm*—Pennie & Edmonds LLP

[57] ABSTRACT

A polymeric article, such as an extruded or molded article or a biaxially oriented tape or film, and a method of stabilizing such a polymeric article to protect the article from degradation due to exposure to UV light. The article is formed by blending a polymeric material with from about 50 to about 5,000 ppm of at least one ortho hydroxy tris-aryl triazine light absorber and from about 500 ppm to about 1.25 percent of at least one oligomeric, polymeric, or high molecular weight HALS having a molecular weight of at least about 500, wherein the weight ratio of HALS to triazine light absorber is from about 3:1 to about 20:1, to form a stabilized polymeric composition, and forming an extruded or molded article or a biaxially oriented tape or film from the stabilized polymeric composition.

33 Claims, No Drawings

METHODS AND COMPOSITIONS FOR PROTECTING POLYMERS FROM UV LIGHT

FIELD OF THE INVENTION

The invention is directed to compositions and a method of protecting polymeric materials from ultraviolet radiation or light ("UV light"). In particular, the invention relates to polymeric articles comprising synergistic combinations of at least one ortho-hydroxy tris-aryl-triazine UV light absorbers and at least one oligomeric, polymeric, or high molecular weight hindered amine light stabilizers ("HALS").

BACKGROUND OF THE INVENTION

It is well-known that UV light or radiation, particularly from sunlight, can cause the degradation of polymers. Often, this results in the embrittlement or yellowing of polymers, which may be in the form of molded articles, polymer films, tapes, coatings, and the like. However, this degradation can be inhibited by the incorporation of ultra-violet light stabilizers and ultra-violet light absorbers in or on such articles.

The use of HALS and UV light absorbers ("UVA"), both individually and in combination, to stabilize polymeric materials is generally known in the art. In particular, UV light absorbers such as benzotriazoles and benzophenones were initially used to stabilize polymeric materials, and to prevent the degradation of such materials from exposure to UV light. Later, it was discovered that HALS, which scavenge free radicals formed in the polymeric material when exposed to UV light, were more effective than UV light absorbers, and thus, UV light absorbers are presently used in combination with at least one HALS in most conventional applications.

European Patent Application No. EP 0 704 560 discloses pigmented fiber of no more than 50 microns thick, in which the pigment is stabilized with a synergistic mixture of a HALS and a UV light absorber. The application discloses that the amount of both the HALS and the UV light absorber that is effective in stabilizing the pigment in the fiber is 0.05 to 5 percent by weight, but provides examples that show no significant improvement when the amount of HALS is increased over the amount of UV light absorber.

European Patent No. EP 0 453 396 discloses coating compositions containing from 0.01 to 5 percent by weight of a mixture of UV light absorbers containing at least one 2-hydroxyphenyl benzotriazole and at least one 2-hydroxyphenyltriazine or 2-hydroxybenzophenone, where the UV light absorbers are present in the molar ratio of 3:1 to 1:3. Optionally, the coating composition may contain a derivative of a polyalkylpiperidine HALS, such as 2,2,6,6-tetramethylpiperidine. Although a number of such polyalkylpiperidine derivatives are disclosed in EP 0 453 396, the amount of HALS useful in the claimed composition is not disclosed, and none of the examples specifically disclose a composition containing a HALS. All examples show some degradation after 1,000 to 2,000 hours of exposure to a Xenon Weatherometer, or after exposure to the sun in Florida for a period of about one year.

U.S. Pat. No. 4,619,956 discloses a method of stabilizing a polymer film, coating, or molded article against the action of light, moisture, and oxygen. The method comprises incorporating a HALS and a tris-aryl-2-triazine UV light absorber into the polymer. Preferably, the HALS is a 2,2,6, 6-tetralkylpiperidine compound, salt, or metal complex, and the UV light absorber is a tris-aryl-2-triazine of formula

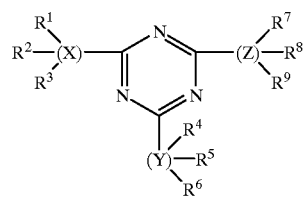

where X, Y, and Z are each aromatic, carbocyclic groups, and at least one of the aromatic groups has a hydroxy group ortho to the point of attachment to the triazine ring. Each of $R^1$ to $R^9$ is hydrogen, hydroxy, alkyl, alkoxy, sulfonic, carboxy, halo, haloalkyl, or acylamino. Each of the UV light absorbers and HALS are used in an amount of from about 0.01 to about 5 percent by weight, but only formulations having equal amounts of UV light absorber and HALS are exemplifies. The compositions are effective in stabilizing the polymeric material, which does not begin to lose gloss or turn yellow until after about 1,000 to about 2,400 hours of exposure to UV light.

U.S. Pat. No. 4,331,586 to Hardy discloses oligomers for use as light stabilizers. While providing protection for polymeric materials such as polypropylene, polymeric films containing the disclosed oligomeric HALS became brittle after exposure to UV light for about 1,700 hours.

Therefore, a need remains for compositions and methods of use thereof that stabilize polymeric materials and provide protection from exposure to UV light for extended periods of time. The present invention provides such methods and compositions.

SUMMARY OF THE INVENTION

The present invention is directed to polymeric articles, such as molded articles, extruded articles, and biaxially oriented tapes and films, where the article comprises a polymeric material, from about 50 to about 5,000 ppm of at least one ortho hydroxy tris-aryl triazine light absorber and from about 500 ppm to about 1.25 percent of at least one oligomeric, polymeric, or high molecular weight HALS having a molecular weight of at least about 500, wherein the weight ratio of HALS to triazine is from about 3:1 to about 20:1, preferably, from about 5:1 to about 10:1, and most preferably from about 6:1 to about 7.5:1. Preferably, the polymeric article is a molded or extruded article having a thickness of no less than about 1 mm.

HALS useful in the invention include oligomers of formula (I)

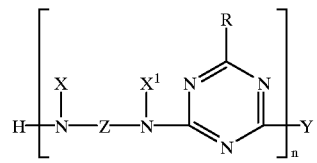

wherein R is morpholino, $C_1$–$C_8$ alkylamine, di($C_1$–$C_8$) alkylamine, pyrrolidyl, or cyclohexylamine, X and $X^1$, which are the same or different, and are hydrogen, $C_1$–$C_{20}$ alkyl, or a radical of formula (II)

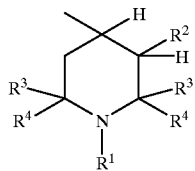

wherein $R^1$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, are the same or different, and are $C_1$–$C_8$ alkyl, benzyl, or phenethyl, or from a $C_5$–$C_{10}$ cycloalkyl; Z is a straight chained or branched $C_2$–$C_{20}$ alkylene or a straight chained or branched $C_2$–$C_{20}$ alkylene chain interrupted by at least oxy, thio, or

radical, wherein $R^5$ is hydrogen, $C_1$–$C_{20}$ alkyl, or the radical of formula (II); $C_5$–$C_{10}$ cycloalkylene,

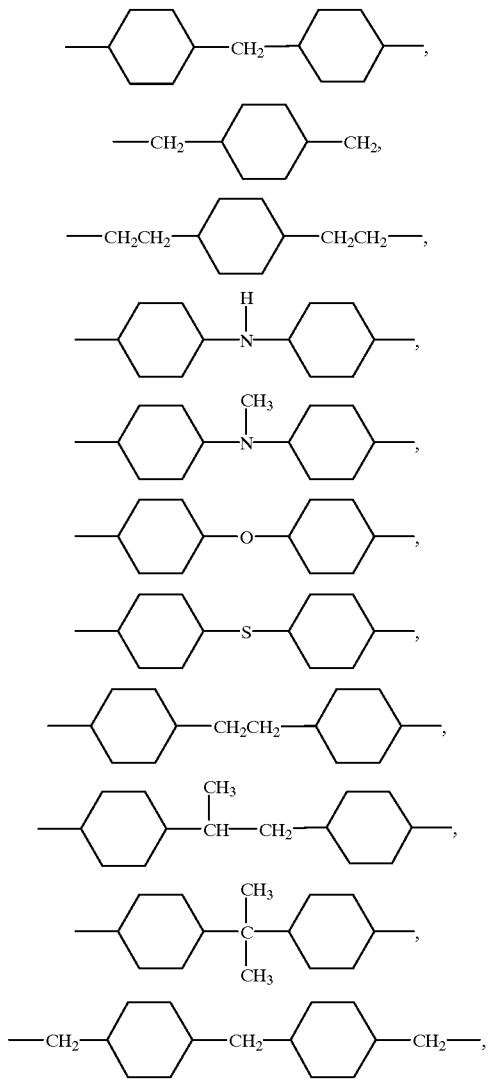

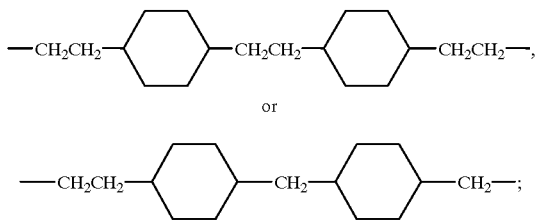

$C_6$–$C_{12}$ arylene, or $C_8$–$C_{14}$ aralkylene; n is an integer greater than 1; and Y is a halogen atom, $C_1$–$C_8$ alkylamine, di($C_1$–$C_8$) alkylamine, pyrrolidyl, morpholino, cyclohexylamine, or

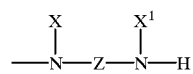

wherein X, $X^1$, and Z are as previously defined; with the proviso that at least one of X and $X^1$ is of formula (II). Most preferably, X and $X^1$ are the same or different, and are of formula (II), wherein R is morpholino or octylamine, $R^1$ is H or $CH_3$, $R^2$ is H, $R^3$ and $R^4$ are $CH_3$, Z is $C_6H_{12}$, and Y is morpholino, octylamine, or

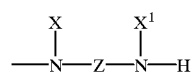

wherein X, $X^1$, and Z are as previously defined.

Other HALS useful in the invention include, but are not limited to the following:

1. Bis(1-octyloxy-2,2,6,6,tetramethyl-4-piperdinyl) sebacate
2. Dimethyl succinate polymer with 4-hydroxy-2,2,6,6-tetramethyl-1-piperidineethanol
3. A blend of dimethyl succinate polymer with 4-hydroxy-2,2,6,6-tetramethyl-1-piperidineethanol and N,N'-bis (2,2,6,6-tetramethyl-4-piperidinyl)-1,6-hexane diamine, polymer with 2,4,6,-trichloro-1,3,5-triazine and 2,4,4-trimethyl-1,2-pentamine
4. 1,3,5-triazine-2,4,6-triamine,N,N'"[1,2-ethanediylbis [[[(4,6-bis[butyl(1,2,2,6,6-pentamethyl-4-piperidinyl) amino]- 1,3,5-triazine-2-yl]imino]-3,1propanediyl]]-bis[N'N"- dibutyl -N',N"-bis(1,2,2,6,6-pentamethyl-4-piperidinyl)
5. 1,3,5-triazine-2,4,6-triamine,N,N'"[1,2,-ethanediylbis [[[(4,6-bis[butyl(1-cyclohexyloxy-2,2,6,6-tetraamethyl- 4-piperidinyl)amino]-1,3,5triazine-2-yl] imino]- 3,1-propanediyl]]-bis[N'N"-dibutyl-N',N"-bis (1,2,2,6,6-pentamethyl-4-piperidinyl)
6. 1,3,5,-triazine-2,4,6-triamine,N,N'"[1,2-ethanediylbis [[[(4,6-bis[butyl(1,2,2,6,6-pentamethyl-4-piperdinyl) amino]- -yl]imino]-3,1propanediyl]]-bis[N'N"-dibutyl-N'N"-bis (1,2,2,6,6-pentamethyl-4-piperidinyl)
7. N,N'-bis(2,2,6,6-tetramethyl-4-piperidinyl)1,6-hexane diamine polymer with2,4,6-trichloro-1,3,5-triazine and 2,4,4-trimethyl-1,2-pentamine
8. Poly-methylpropyl-3-oxy-(4(2,2,6,6-tetramethyl) piperidinyl) siloxane
9. Poly-methylpropyl-3-oxy-(4(1,2,2,6,6-pentamethyl) piperidinyl) siloxane
10. Polyalkyl-1-oxa-diazaspirodecane products of a reaction of tetramethyl-7-oxa-3,20-diaza-21-oxo-dispiro (5.1.11.12)heneicosane with epichlorohydrin 11. 1,3-propanediamine,N,N''-1,2-ethanediylbis-,polymer with 2,4,6-trichloro-1,3,5-triazine, reaction products with N-butyl-2,2,6,6-tetramethyl-4-piperidinamine.

Typically, the triazine light absorber is of formula (III)

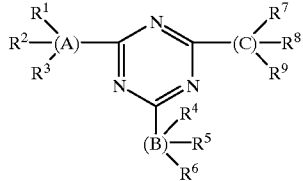

wherein A, B and C are each aromatic, at least one of A, B and C is substituted by a hydroxy group ortho of the point of attachment to the triazine ring, and each of $R^1$ through $R^9$ is selected from the group consisting of hydrogen, hydroxy, alkyl, alkoxy, sulfonic, carboxy, halo, haloalkyl and acylamino. Preferably, the triazine light absorber is of formula (IV)

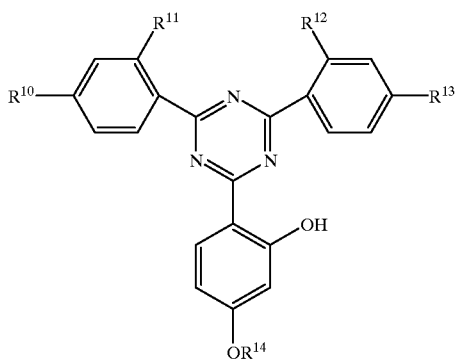

where $R^{10}$, $R^{11}$, $R^{12}$ and $R^{13}$ are the same or different, and are individually selected from the group consisting of hydrogen, hydroxy, alkyl, alkoxy, sulfonic, carboxy, halo, haloalkyl and acylamino, and $R^{14}$ is hydrogen or $C_1$ to $C_{18}$ alkyl. Most preferably, $R^{10}$, $R^{11}$, $R^{12}$ and $R^{13}$ are H or $CH_3$, and $R^{14}$ is hydrogen, $C_6H_{13}$, or $C_8H_{17}$.

Other useful triazine light absorbers include, but are not limited to
2-(4,6-Diphenyl-1,3,5-triazine-2-yl)-5-(hexyl)oxy-phenol,
2-(4-((2-hydroxy-3-dodecyloxypropyl)-oxyl-2-hydroxyphenyl.)-4, 6-bis(2,4-dimethylphenyl)-1,3,5-triazine,
2-(4-((2-hydroxy-3-tridecyloxypropyl)-oxyl-2-hydroxyphenyl) -4,6-bis(2,4-dimethylphenyl)-1,3,5-triazine,
2-(4-((2-hydroxy-3-tridecyloxypropyl)-oxyl-2-hydroxyphenyl) -4,6-bis(2,4-dimethylphenyl)-1,3,5-triazine, and
2-(4-((2-hydroxy-3-isooctyloxyypropyl)-oxyl-2-hydroxyphenyl) -4,6-bis(2,4-dimethylphenyl)-1,3, 5-triazine, and blends thereof.

The light stabilized polymeric article may be formed from a polymeric material, such as any of a polyolefin, polyester, polyether, polyketone, polyamide, natural or synthetic rubber, polyurethane, polystyrene, high-impact polystyrene, polyacrylate, polymethacrylate, polyacetal, polyacrylonitrile, polybutadiene, polystyrene, ABS, SAN (styrene acrylonitrile), ASA (acrylate styrene acrylonitrile), cellulosic acetate butyrate, cellulosic polymer, polyimide, polyamideimide, polyetherimide, polyphenylsulfide, PPO, polysulfone, polyethersulfone, polyvinylchloride, polycarbonate, polyketone, aliphatic polyketone, thermoplastic TPU, aminoresin crosslinked polyacrylate or polyester, polyisocyanate crosslinked polyester or polyacrylate, phenol/formaldehyde, urea/formaldehyde or melamine/formaldehyde resin, drying or non-drying alkyd resin, alkyd resin, polyester resin, acrylate resins crosslinked with melamine resin, urea resin, isocyanate, isocyanurate, carbamate, or epoxy resin, cross-linked epoxy resins derived from aliphatic, cycloaliphatic, heterocyclic or aromatic glycidyl compound, which are cross-linked with an anhydride or amine, polysiloxane, Michael addition polymer, amine, blocked amine with activated unsaturated or methylene compound, ketimine with activated unsaturated or methylene compound, polyketimine in combination with unsaturated acrylic polyacetoacetate resin, polyketimine in combination with unsaturated acrylic resin, radiation curable composition, epoxymelamine resin, organic dye, cosmetic product, cellulose-based paper formulation, photographic film paper, ink, and blends thereof.

Preferably, the light stabilized polymeric article is formed from a polyolefin homopolymer, copolymer, or terpolymer, and, more preferably, a homopolymer, copolymer, or terpolymer of polyethylene or polypropylene, where the polyethylene or polypropylene is a product of polymerization in the presence of at least one single site catalyst, at least one Ziegler-Natta catalyst, or both a Ziegler-Natta catalyst and at least one single site catalyst.

Other useful polymeric material that may be used to form the articles of the invention include, but are not limited to, polyamides, polyesters, polyacetals, and polyurethanes.

The present invention is also directed to a light stabilization additive composition, comprising at least one ortho hydroxy tris-aryl triazine light absorber and at least one oligomeric, polymeric, or high molecular weight HALS having a weight average molecular weight of at least about 500, wherein the weight ratio of HALS to triazine light absorber is from about 3:1 to about 20:1, as described above, and to a light stabilization additive concentrate, comprising from about 30 to about 98 percent, preferably from about 50 to about 95 percent, by weight of a polymeric resin, at least one ortho hydroxy tris-aryl triazine light absorber and at least one oligomeric, polymeric, or high molecular weight HALS having a weight average molecular weight of at least about 500, wherein the weight: ratio of HALS to triazine light absorber is from about 3:1 to about 20:1, where the concentrate may be in the form of pellets, prills, or pastilles. The additive composition nay be formed by spraying solutions of the light absorber and HALS, melt blending, extrusion, or by physical compaction.

The present invention is further directed to a method of forming a stabilized polymeric article. The method comprises blending a polymeric material with from about 50 to about 5,000 ppm of at least one ortho hydroxy tris-aryl triazine light absorber and from about 500 ppm to about 1.25 percent of at least one oligomeric, polymeric, or high molecular weight HALS having a weight average molecular weight of at least about 500, wherein the weight ratio of HALS to triazine light absorber is from about 3:1 to about 20:1, to form a stabilized polymeric composition, and forming an extruded our molded article or a biaxially oriented tape or film from the stabilized polymeric composition.

DETAILED DESCRIPTION OF THE INVENTION

The present invention is directed to compositions for stabilizing polymeric materials, such as molded or extruded articles, biaxially oriented tapes and films, and coatings, to prevent degradation from exposure to UV light, especially UV light having a wavelength of from about 290 to about 350 nm. It has been unexpectedly discovered that when from about 50 to about 5,000 ppm (parts per million) of an ortho hydroxy tris-aryl triazine and from about 500 ppm to about 1.25 percent of an oligomeric, polymeric, or high molecular weight HALS is blended with a polymeric material in a weight ratio of HALS to triazine of from about 3:1 to about 20:1, preferably from about 5:1 to about 10:1, and most preferably from about 6:1 to about 7.5:1, the polymeric material is protected from exposure to UV Light for a period of time substantially greater than afforded by any prior art light stabilizer composition containing a HALS, a UV light absorber, or a combination thereof.

Preferably, the oligomeric, polymeric, or high molecular weight HALS has a weight average molecular weight which is greater than about 500, and, preferably, greater than about 1,000.

Suitable HALS are oligomers of the type disclosed in U.S. Pat. No. 4,331,586, the contents of which are incorporated herein in their entirety.

HALS useful in the invention include, but are not limited to oligomers of formula (I)

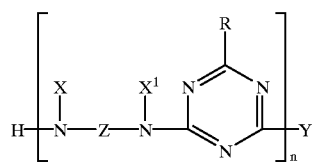

wherein R is morpholino, $C_1$–$C_8$ alkylamine, di($C_1$–$C_8$) alkylamine, pyrrolidyl, or cyclohexylamino, and is preferably morpholino or octylamine, X and $X^1$, which are the same or different, represent hydrogen, $C_1$–$C_{20}$ alkyl, or the radical (II)

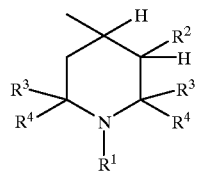

where $R^1$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, which may be the same or different, represent $C_1$–$C_8$ alkyl, benzyl, or phenethyl, or together with the carbon to which they are attached form a $C_5$–$C_{10}$ cycloalkyl; Z represents $C_2$–$C_{20}$ straight chained or branched alkylene, where the alkaline chain may be interrupted by oxy, thio, or

radicals, wherein $R^5$ represents hydrogen, $C_1$–$C_{20}$ alkyl, or the radical (II); $c_5$–$C_{10}$ cycloalkylene,

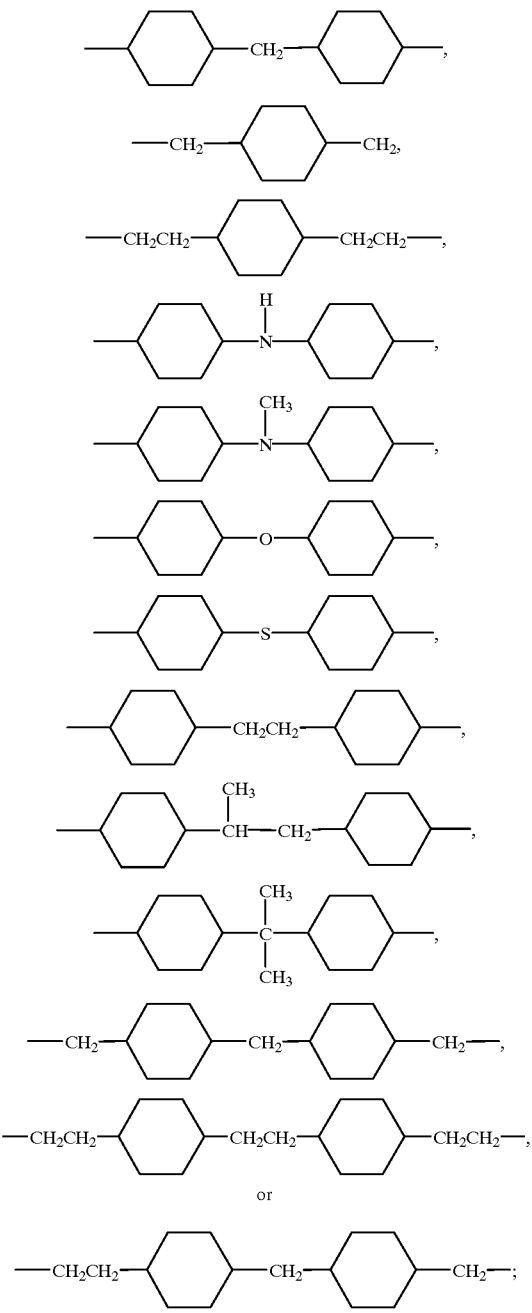

$C_6$–$C_{12}$ arylene, or $C_8$–$C_{14}$ aralkylene; n is an integer greater than 1; and, Y represents a halogen atom, $C_1$–$C_8$ alkylamine, di ($C_1$–$C_8$) alkylamine, pyrrolidyl, morpholino, or

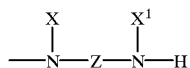

wherein X, $X^1$, and Z are as previously defined; with the proviso that at least one piperidinyl moiety of formula (II) is present in the repeating unit.

The preferred compositions of formula (I) are those wherein both X and $X^1$ are the moiety of formula (II). The especially preferred compositions of formula (I) are those wherein X and $X^1$ are 2,2,6,6-tetramethyl-4-piperidinyl, and Z is hexamethylene.

Ortho hydroxy tris-aryl triazines useful in the present invention as UV light absorbers are of the type disclosed in U.S. Pat. No. 4,619,956, the contents of which are incorporated herein in their entirety. Generally, the triazine light absorber of the invention is of the formula (III)

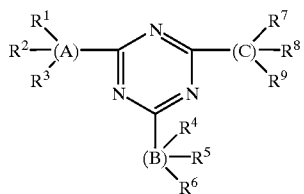

(III)

wherein A, B and C are each aromatic, at least one of A, B and C is substituted by a hydroxy group ortho of the point of attachment to the triazine ring, and each of $R^1$ through $R^9$ is selected from the group consisting of hydrogen, hydroxy, alkyl, alkoxy, sulfonic, carboxy, halo, haloalkyl and acylamino.

Preferably, the triazine light absorber is of formula (IV)

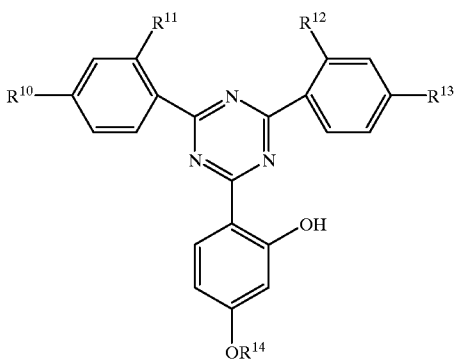

(IV)

where $R^{10}$, $R^{11}$, $R^{12}$ and $R^{13}$ are as described above for $R^1$ to $R^9$, and are most preferably H or $CH_3$, and $R^{14}$ is hydrogen or $C_1$ to $C_{18}$ alkyl with hydrogen, $C_6$ alkyl, and $C_8$ alkyl being most preferred.

Typically, a polymeric article, such as a molded, or extruded article or a biaxially oriented tape or film, may be stabilized in the present invention by blending from about. 50 to about 5,000 ppm of the triazine light absorber of the invention and about 500 ppm to about 1.25 percent of the HALS of the invention with a polymeric material used to form then article. The ratio of HALS to triazine light absorber in typically from about 20:1 to 3:1, preferably from about 10:1 to about 5:1, and most preferably from about 6:1 to about 7.5:1. Ideally, for polyolefins, the ratio is about 7:1, i.e., about 2,000 ppm HALS and about 300 ppm triazine, based on the weight of the polymeric material.

Although the HALS and triazine light absorber of the invention may be added to the polymeric material individually during processing of the polymeric material bar any means known in the art, a mixture of the two components may be formed prior to processing. Typically, the additive composition of the invention is formed into pellets, prills, or pastilles comprising the HALS and UV light absorbers of the invention. This may be accomplished by melting the HALS and the triazine together, and extruding the mixture, spraying solutions of the two components together to form pellets or prills of the mixture upon the evaporation of the solvent, or by physical compaction.

The light stabilization additive composition of the invention may also be provided in the form of a concentrate containing from about 2 to about 70 percent, and preferably from about 5 to about 50 percent of the additive composition with the remainder comprising polymeric resin, and where the ratio of HALS to triazine light absorber in typically from about 20:1 to 3:1, preferably from about 10:1 to about 5:1.

The light stabilization additive composition of the invention may be used to stabilize thermoplastic substrates such as polyolefins, polyesters, polyethers, polyurethanes; polyamides, polystyrenes, high-impact polystyrenes, and the like, as molded articles, films, and the like. Preferably, the thermoplastic substrate is a polyolefin.

As used herein, the term "polyolefin" includes homopolymers of alpha olefins such as polyethylene, polypropylene, polybutadiene, polyisoprene, and the like; copolymers of alpha olefins, including ethylene-propylene copolymers, ethylene-butene, ethylene-hexene, and ethylene-octene copolymers, ethylene-vinyl acetate copolymers, styrene-butadiene copolymers, acrylonitrile-butadiene-styrene terpolyomers, and the like. Preferred polyolefins include polyethylene and polypropylene.

Other organic materials susceptible to degradation by the effects of light, the properties of which are improved by the incorporation therein of a compound of this invention, include polystyrene, natural and synthetic rubbers; the latter including, for example, homo-, co-, and terpolymers of acrylonitrile, butadiene and styrene, and blends thereof.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'-bis(2,6-di-t-butylphenol); tetrakisp[methylene(3,5-ditert-butyl)4-hydroxy-hydrocinnamate)]methane; 1,3,5-tris(4-tert-butyl-3-hydroxy-2,6-dimethylbenzyl)-1,3,5-triazine-2,4,6-(1H,3H,5H)-trione; 1,3,5-tris(3,5-di-tert-butyl-4-hydroxybenzyl)-s-triazine-2,4, 6-(1H,3H,5H)-trione; tris(2,4-ditert-butylphenyl)phosphite; bis(2,4-dit-butylphenyl) pentaerythritol diphosphite; 2[[2,4,8,10-tetrakis(1,1-dimethylethyl)dibenzo[d,f][1,3,2] dioxaphosphepin-6-yl] oxy]-N,N-bis[2[[2,4,8,10-tetrakis(1,1-dimethylethyl) dibenzo[d,f][1,3,2]dioxaphosphepin-6-yl]oxy] ethanamine; oxidized bis(tallow alkyl) amines; 4,4'-bis(2,6-diisopropylphenol); 2,4,6-tri-t-butylphenol; 2,2'-thiobis(4-methyl-6-t-butyl phenol); octadecyl 2(3',5'-di-t-butyl-4-'hydroxyphenyl)-propionate, etc; esters of thiodipropionic acid, such as dilauryl thiodipropionate and distearyl thiodipropionate, etc; hydrocarbyl phosphites, such as triphenyl phosphite, trinonyl phosphite, diisodecyl pentaerythritol diphosphate, diphenyldecyl phosphite, etc. and combinations thereof.

Suitable supplemental light stabilizers include those of the benzotriazole class, such as
2-(2'-hydroxy-5-t-octylphenyl)benzotriazole;
2(2'-hydroxy-3'-5'-di-t-butylphenyl)-5-chlorobenzotriazole;
hose of the hydroxybenzophenone type, such as
2-hydroxy-4-methoxybenzophenone;
2-hydroxy-4-octyloxybenzophenone;
2'-dihydroxy-4,4'-di-methoxybenzophenone; hindered phenol. esters, such as n-hexadecyl 3,5-di-t-butyl-4-hydroxybenzoate, and -2'4'-di-t-butylphenyl 3,5-di-butyl- 4-hydroxybenzoate; metal complexes of 2,2'-thiobis(4-t-octylphenol); nickel complexes of bis(4-t-octylphenyl) sulfone; nickel dibutyl dithiocarbamate; nickel salts of 4-hydroxy-3,-di-t-butylbenzyl phosphoric acid monoalkyl esters where alkyl is methyl, ethyl, propyl, butyl, etc; nickel complex of 2-hydroxy-4-methylphenyl undecyl ketone oxime, etc.

Polymeric articles that may be protected from UV light with the present invention include, but are not limited to molded or extruded articles, coatings, tapes, and films. The articles may be formed by extrusion, sheet extrusion, injection molding, blow molding, injection blow molding, rotational or roto-molding, calendering, thermoforming, compression molding, vacuum molding, pressure molding, reaction injection molding, and other similar techniques known in the art. In addition, coatings may be applied by powder coating, extrusion coating, electrocoating, spraying, dipping, and other similar techniques known in the art.

EXAMPLES

The following non-limiting examples are merely illustrative of the preferred embodiments of the present invention, and are not to be construed as limiting the invention, the scope of which is defined by the appended claims.

Example 1.

Test samples were prepared as follows: Irganox 1010 (0.5 g), an antioxident, Irgafos 168 (1.0 g), a phosphite as a processing stabilizer, and zinc stearate (0.25 g) were dry blended with LLDPE (low density polyethylene) and the UV stabilizers listed in TABLE 1. The resulting formulations were compounded at 175° C. on a one and one quarter inch single screw extruder, and converted to tensile bars by injection molding at 200° C. with a mold temperature of 60° C. The tensile bars were exposed in an Atlas Ci65 WOM with water spray, and elongation at break was measured as a function of time. The results, which are provided as the percent elongation at break, are provided in TABLE 1, where an elongation of less than 50 percent is considered failure.

maintains 80 percent of its initial elongation. In contrast, the elongation at break for the compositions light stabilized by the prior art compositions begins to dramatically decrease after exposures to UV light: of only 4,000 to 10,000 hours, with failure, i.e., less than 50 percent elongation at break, occurring at 10,000 to 16,000 hours.

Example 2

The ability of the light stabilizing compositions disclosed in U.S. Pat. No. 4,619,956 to Susi ("the '956 patent") to protect polymeric materials from degradation on exposure to UV light was compared to that of the compositions of the present invention. The '956 patent exemplifies the effect of prolonged exposure of polymeric materials to UV light, where each sample of polymeric material contains equal amounts of a light stabilizing compositions comprising a triazine light absorber of formula

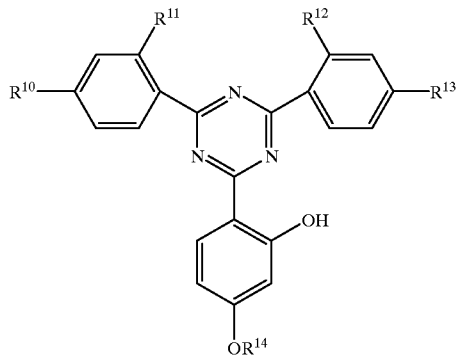

where $R^{10}$, $R^{11}$, $R^{12}$ and $R^{13}$ are $CH_3$, and $R^{14}$ is $C_8$ alkyl, and a commercially available HALS, i.e., Tinuvin® 765, Tinuvin® 440, Tinuvin® 900, and Sanduvor® 3050. Upon exposure to alternate cycles of 8 hours of exposure to UV light followed by no UV for 4 hours, the sample of polymeric material show a pronounced decrease in gloss and an increase in yellowness after periods of from 1,200 to 2,400 hours. In contrast, polymeric material comprising the com-

TABLE 1

| Formulation | 0 hrs. | 4,000 hrs. | 6,000 hrs. | 8,000 hrs. | 10,000 hrs. | 12,000 hrs. | 14,000 hrs. | 16,000 hrs. |
| --- | --- | --- | --- | --- | --- | --- | --- | --- |
| Chimassorb 944 (0.3%)[1] | 514 | 551 | 486 | 361 | 218 | 118 | 67 | 46 |
| Tinuvin 622 (0.3%)[2] | 509 | 226 | 152 | 61 | 43 | | | |
| Cyasorb ® UV 3346 light stabilizer (0.3%)[3] | 501 | 548 | 479 | 410 | 301 | 90 | 85 | 45 |
| Cyasorb ® UV 3346 light stabilier (0.2%) Cyasorb ® UV 1164 (0.03%)[4] | 502 | 570 | 483 | 440 | 411 | 442 | 527 | 402 |

[1]N,N'-bis(2,2,6,6-tetramethyl-4-piperidinyl)-1,6-hexane diamine, polymer with 2,4,6-trichloro-1,3,5-triazine and 2,4,4-trimethyl-1,2-pentamine
[2]Dimethyl succinate polymer with 4-hydroxy-2,2,6,6-tetramethyl-1-piperidineethanol
[3]Poly[(6-morpholino-s-triazine-2,4-diyl)]
[2,2,6,6-tetramethyl-4-piperidyl)imino]-hexamethylene
[(2,2,6,6-tetramethyl)-4-piperidyl]imino]
[4]A compound of formula (IV), where $R^{10}$, $R^{11}$, $R^{12}$ and $R^{13}$ are all methyl, and $R^{14}$ is $C_8H_{17}$.

As can be clearly seen from the data, the composition light stabilized by the invention is far superior to the prior art compositions, providing protection from UV light for as long as 16,000 hours, at which point the composition still positions of the invention retain useful properties for at least 16,000 hours, clearly demonstrating the superiority of the compositions of the invention when compared to compositions containing equal amounts of HALS and triazine.

Example 3

A polyamide light stabilized by blending the polyamide with from about 50 to about 5,000 ppm of an ortho-hydroxy tris-aryl triazine light absorber and from about 500 ppm to about 1.25 percent of an oligomeric, polymeric, or high molecular weight HALS having a weight average molecular weight of at least 500, where the weight ratio of HALS to triazine light absorber is from about 3:1 to about 20:1, maintains useful physical properties when exposed to UV light for a significantly longer period of time than polyamide blended with prior art light stabilizer compositions. Good results are obtained when the weight ratio of HALS to triazine light absorber is from about 5:1 to about 10:1.

Example 4

A polyester light stabilized by blending the polyester with from about 50 to about 5,000 ppm of an ortho-hydroxy tris-aryl triazine light absorber and from about 500 ppm to about 1.25 percent of an oligomeric, polymeric, or high molecular weight HALS having a weight average molecular weight of at least 500, where the weight ratio of HALS to triazine light absorber is from about 3:1 to about 20:1, maintains useful physical properties when exposed to UV light for a significantly longer period of time than polyester blended with prior art light stabilizer compositions. Good results are obtained when the weight ratio of HALS to triazine light absorber is from about 5:1 to about 10:1.

Example 5

A polyacetal light stabilized by blending the polyacetal with from about 50 to about 5,000 ppm of an ortho-hydroxy tris-aryl triazine light absorber and from about 500 ppm to about 1.25 percent of an oligomeric, polymeric, or high molecular weight HALS having a weight average molecular weight of at least 500, where the weight ratio of HALS to triazine light absorber is from about 3:1 to about 20:1, maintains useful physical properties when exposed to UV light for a significantly longer period of time than polyacetal blended with prior art light stabilizer compositions. The best results are obtained when the weight ratio of HALS to triazine light absorber is from about 5:1 to about 10:1.

Example 6

A polyurethane light stabilized by blending the polyurethane with from about 50 to about 5,000 ppm of an ortho-hydroxy tris-aryl triazine light absorber and from about 500 ppm to about 1.25 percent of an oligomeric, polymeric, or high molecular weight HALS having a weight average molecular weight of at least 500, where the weight ratio of HALS to triazine light absorber is from about 3:1 to about 20:1, maintains useful physical properties when exposed to UV light for a significantly longer period of time than polyurethane blended with prior art light stabilizer compositions. Good results are obtained when the weight ratio of HALS to triazine light absorber is from about 5:1 to about 10:1.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

What is claimed is:

1. A polymeric article, comprising a polymeric material, from about 50 to about 5,000 ppm of at least one ortho-hydroxy tris-aryl triazine light absorber, and from about 500 ppm to about 1.25 percent of at least one oligomeric, polymeric, or high weight average molecular HALS having a molecular weight of at least 500, wherein the weight ratio of HALS to triazine is from about 3:1 to about 20:1, and wherein the polymeric article is a molded article, an extruded article, or a biaxially oriented tape or film, and wherein the HALS is an oligomer of formula (I)

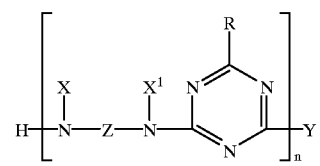

wherein R is morpholino, $C_1$–$C_8$ alkylamine, di($C_1$–$C_8$) alkylamine, pyrrolidyl, or cyclohexylamine, X and $X^1$, which are the same or different, and are hydrogen, $C_1$–$C_{20}$ alkyl, or a radical of formula (II)

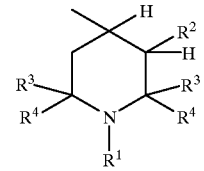

wherein $R_1$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, are the same or different, and are $C_1$–$C_8$ alkyl, benzyl, or phenethyl, or form a $C_5$–$C_{10}$ cycloalkyl; Z is a straight chained or branched $C_2$–$C_{20}$ alkylene or a straight chained or branched $C_2$–$C_{20}$ alkalene chain interrupted by at least oxy, thio, or

radical, wherein $R^5$ is hydrogen, $C_1$–$C_{20}$ alkyl, or the radical of formula (II); $C_5$–$C_{10}$ cycloalkylene,

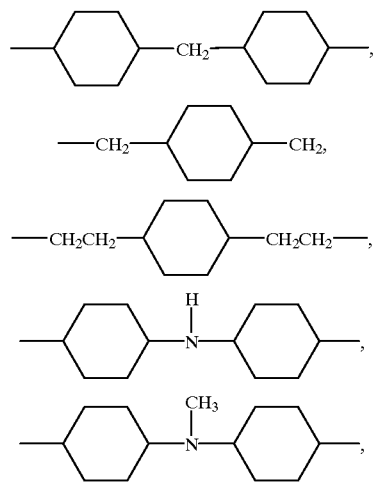

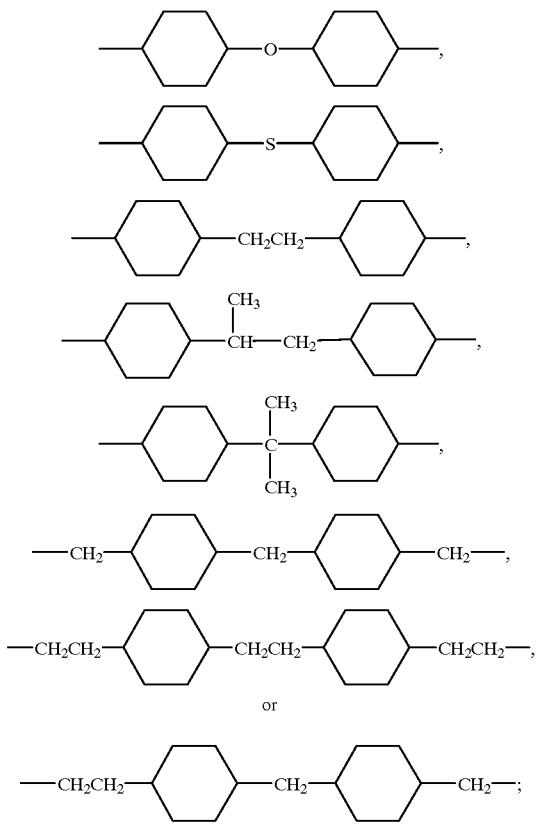

$C_6-C_{12}$ arylene, or $C_8-C_{14}$ aralkylene; n is an integer greater than 1; and Y is a halogen atom, $C_1-C_8$ alkylamine, di($C_1-C_8$) alkylamine, pyrrolidyl, morpholino, cyclohexylamine, or

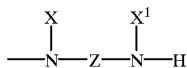

wherein X, $X^1$, and Z are as previously defined; with the proviso that at least one of X and $X^1$ is of formula (II); or is selected from the group consisting of
(1) Bis(1-octyloxy-2,2,6,6,tetramethyl4-piperdinyl) sebacate;
(2) dimethyl succinate polymer with 4-hydroxy-2,2,6,6-tetramethyl-l-piperidineethanol;
(3) a blend of dimethyl succinate polymer with 4-hydroxy-2,2,6,6-tetramethyl-1-piperidineethanol and N,N'-bis(2,2,6,6-tetramethyl-4-piperidinyl)-1,6-hexane diamine polymer with 2,4,6-trichloro-1,3,5-triazine and 2,4,4-triethyl-1,2-pentamine;
(4) 1,3,5-triazine-2,4,6-triamine,N,N'"[1,2-ethanediylbis [[[(4,6-bis[butyl(1,2,2,6,6-pentamethyl-4-piperidinyl) amino]-1,3,5-triazine-2-yl]imino]-3,1pr opanediyl]]-bis [N'N"-dibutyl-N',N"-bis(1,2,2,6,6-pentamethyl4piperidinyl), 1,3,5-triazine-2,4,6-triamine, N,N'"[1 ,2-ethanediylbis [[[(4,6-bis[butyl( 1-cyclohexyloxy-2,2,6,6-tetraamethyl-4-piperidinyl)amino]-1,3,5-triazine-2-yl]imino]-3,1-propanediyl]]-bis [N'N"-dibutyl-N',N"-bis (1,2,2,6,6-pentamethyl4piperidinyl), 1,3,5-triazine-2,4,6-triamine, N,N'"[1,2-ethanediylbis [[[(4,6-bis[butyl(1,2,2,6,6-pentamethyl-4-piperidinyl)amino]-2-yl]imino]-3,1 propanediyl]]-bi s[N'N"-dibutyl-N',N"-bis (1,2,2,6,6-pentamethyl4piperidinyl);
(5) N,N'-bis(2,2,6,6-tetramethyl-4-piperidinyl)-1,6-hexane diamine polymer with 2,4,6-trichloro-1,3,5-triazine and 2,4,4-trimethyl-1,2-pentamine;
(6) poly-methylpropyl-3-oxy-(4(2,2,6,6-tetramethyl) piperidinyl) siloxane;
(7) poly-methylpropyl-3-oxy-(4(1,2,2,6,6-pentamethyl) piperidinyl)siloxane;
(8) polyalkyl-1-oxa-diazaspirodecane products of a reaction of tetramethyl-7-oxa-3,20-diaza-21-oxo-dispiro (5,1,11,12)heneicosane with epichlorohydrin; and
(9) 1,3-propanediamine,N,N"-1,2-ethanediylbis-,polymer with 2,4,6-trichioro-1,3,5-triazine, reaction products with N-butyl-2,2,6,6-tetramethyl-4-piperidinamine.

2. The polymeric article of claim 1, wherein the ratio of HALS to triazine light absorber is from about 5:1 to about 10:1.

3. The polymeric article of claim 1, wherein the ratio of HALS to triazine light absorber is in the range of from about 6:1 to about 7.5:1.

4. The polymeric article of claim 1, wherein the HALS is an oligomer of formula (I).

5. The polymeric article of claim 1, wherein X and $X^1$ are the same or different, and are of formula (II), wherein R is morpholino or octylamine, $R^1$ is H or $CH_3$, $R^2$ is H, $R^3$ and $R^4$ are $CH_3$, Z is $C_6H_{12}$, and Y is morpholino, octylamine,

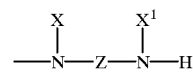

wherein X, $X^1$, and Z are as previously defined.

6. The polymeric article of claim 1, wherein the HALS is selected from the group consisting of
Bis(1-octyloxy-2,2,6,6,tetramethyl-4-piperdinyl)sebacate, dimethyl succinate polymer with
4-hydroxy-2,2,6,6-tetramethyl-1-piperidineethanol, a blend of dimethyl succinate polymer with
4-hydroxy-2,2,6,6-tetramethyl-1-piperidineethanol and N,N'-bis(2,2,6,6-tetramethyl-4-piperidinyl)-1,6-hexane diamine,polymer with 2,4,6-trichloro-1,3,5-triazine and 2,4,4-trimethyl-1,2-pentamine,
1,3,5-triazine-2,4,6-triamine,N,N'"(1,2-ethanediylbis [[[(4,6-bis[butyl(1,2,2,6,6-pentamethyl-4-piperidinyl)amino]-1,3,5-triazine-2-yl]imino]-3,1propanediyl]]-bis[N'N"-dibutyl-N', N"'-bis(1,2,2,6,6-pentamethyl-4-piperidinyl),
1,3,5-triazine-2,4,6-triamine,N,N'"[1,2-ethanediylbis [[[(4,6-bis[butyl(1-cyclohexyloxy-2,2,6,6-tetraamethyl -4-piperidinyl)amino]-1,3,5-triazine-2-yl]imino]-3,1-propanediyl]]-bis[N'N"-dibutyl-N',N"-bis (1,2,2,6,6-pentamethyl-4-piperidinyl),
1,3,5-triazine-2,4,6-triamine,N,N'"[1,2-ethanediylbis [[8 (4,6-bis[butyl(1,2,2,6,6-pentamethyl-4-piperidinyl) amino]-2-yl]imino]-3,1propanediyl]]-bis[N'N"-dibutyl-N',N"-bis (1,2,2,6,6-pentamethyl-4-piperidinyl),
N,N'-bis(2,2,6,6-tetramethyl-4-piperidinyl)-1,6-hexane diamine polymer with 2,4,6-trichloro-1,3,5-triazine and 2,4,4-trimethyl-1,2-pentamine,
poly-methylpropyl-3-oxy-(4(2.2.6.6-tetramethyl) piperidinyl) siloxane,
poly-methylpropyl-3-oxy-(4(1,2.2.6.6-pentamethyl) piperidinyl) siloxane, polyalkyl-1-oxa-diazaspirodecane products of a reaction of tetramethyl-7-oxa-3,20-diaza-21-oxo-dispiro (5.1.11.12)heneicosane with epichlorohydrin,
1,3-propanediamine,N,N"-1,2-ethanediylbis-,polymer with 2,4,6-trichloro-1.3.5-triazine, reaction products with N-butyl-2,2,6,6-tetramethyl-4-piperidinamine.

7. The polymeric article of claim 1, wherein the triazine light absorber is of formula (III)

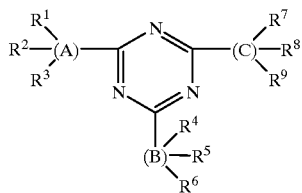

wherein A, B and C are each aromatic, at least one of A, B and C is substituted by a hydroxy group ortho of the point of attachment to the triazine ring, and each of $R^1$ through $R^9$ is selected from the group consisting of hydrogen, hydroxy, alkyl, alkoxy, sulfonic, carboxy, halo, haloalkyl and acylamino.

8. The polymeric article of claim 7, wherein the triazine light absorber is of formula (IV)

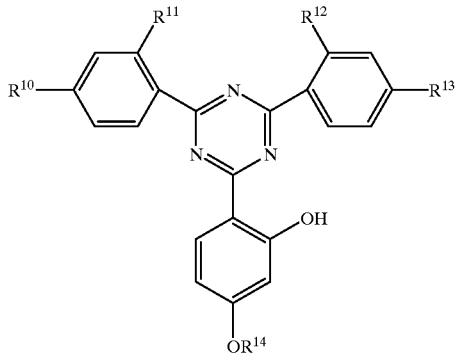

where $R^{10}$, $R^{11}$, $R^{12}$ and $R^{13}$ are the same or different, and are individually selected from the group consisting of hydrogen, hydroxy, alkyl, alkoxy, sulfonic, carboxy, halo, haloalkyl and acylamino, and $R^{14}$ is hydrogen or $C_1$ to $C_{18}$ alkyl.

9. The polymeric article of claim 8, wherein $R^{10}$, $R^{11}$, $R^{12}$ and $R^{13}$ H or $CH_3$, and $R^{14}$ is hydrogen, $C_6H_{13}$, or $C_8H_{17}$.

10. The polymeric article of claim 7, wherein the triazine light absorber is selected from the group consisting of
2-(4,6-Diphenyl-1,3,5-triazine-2-yl)-5-(hexyl)oxy-phenol,
2-(4-((2-hydroxy-3-dodecyloxypropyl)-oxyl-2-hydroxyphenyl -4, 6-bis(2,4-dimethylphenyl)-1,3, 5-triazine,
2-(4-((2-hydroxy-3-tridecyloxypropyl)-oxyl-2-hydroxyphenyl) -4,6-bis(2,4-dimethylphenyl)-1,3,5-triazine, and
2-(4-((2-hydroxy-3-isooctyloxyypropyl)-oxyl-2-hydroxyphenyl) -4,6-bis(2,4-dimethylphenyl)-1,3,5-triazine.

11. The polymeric article of claim 1, wherein the polymeric article is a molded or extruded article having a thickness of no less than about 1 mm.

12. The polymeric article of claim 1, wherein the polymeric material is selected from the group consisting of polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, ABS, SAN (styrene acrylonitrile), ASA (acrylate styrene acrylonitrile), cellulosic acetate butyrate, cellulosic polymers, polyimides, polyamideimides, polyetherimides, polyphenylsulfide, PPO, polysulfones, polyethersulfones, polyvinylchlorides, polycarbonates, polyketones, aliphatic polyketones, thermoplastic TPU's, aminoresin crosslinked polyacrylates and polyesters, polyisocyanate crosslinked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketiminaes in combination with unsaturated acrylic polyacetoacetate resins, polyketimines in combination with unsaturated acrylic resins, radiation curable compositions, epoxymelamine resins, organic dyes, cosmetic products, cellulose-based paper formulations, photographic film paper, ink, and blends thereof.

13. The polymeric article of claim 1, wherein the polymeric material is a polyolefin homopolymer, copolymer, or terpolymer.

14. The polymeric article of claim 13, wherein the polymeric material is a homopolymer, copolymer, or terpolymer of polyethylene or polypropylene.

15. The polymeric article of claim 14, wherein the polyethylene or polypropylene is a product of polymerization in the presence of at least one Ziegler-Natta catalyst.

16. The polymeric article of claim 14, wherein the polyethylene or polypropylene is a product of polymerization in the presence of at least one single site catalyst.

17. The polymeric article of claim 14, wherein the polyethylene or polypropylene is a product of polymerization in the presence of both a Ziegler-Natta catalyst and at least one single site catalyst.

18. The polymeric article of claim 1, wherein the polymeric material is selected from the group consisting of polyamides, polyesters, polyacetals, and polyurethanes.

19. The polymeric article of claim 18, wherein the weight ratio of HALS to triazine light absorber is from about 5:1 to about 10:1.

20. The polymeric article of claim 18, wherein the weight ratio of HALS to triazine light absorber is from about 6:1 to about 7.5:1.

21. A light stabilization additive composition, comprising at least one ortho hydroxy tris-aryl triazine light absorber and at least one oligomeric, polymeric, or high molecular weight HALS having a weight average molecular weight of at least about 500, wherein the weight ratio of HALS to triazine light absorber is from about 3:1 to about 20:1, and wherein the HALS is an oligomer of formula (I)

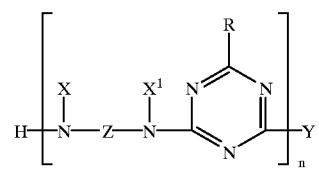

wherein R is morpholino, $C_1$–$C_8$ alkylamine, di($C_1$–$C_8$) alkylamine, pyrrolidyl, or cyclohexylamine, X and $X^1$, which are the same or different, and are hydrogen, $C_1$–$C_{20}$ alkyl, or radical of formula (II)

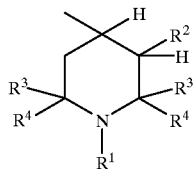

wherein $R^1$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, are the same or different, and are $C_1$–$C_8$ alkyl, benzyl, or phenethyl, or form a $C_5$–$C_{10}$ cycloalkyl; Z is a straight chained or branched $C_2$–$C_{20}$ alkylene or a straight chained or branched $C_2$–$C_{20}$ alkalene chain interrupted by at least oxy, thio, or

radical, wherein $R^5$ is hydrogen, $C_1$–$C_{20}$ alkyl, or the radical of formula (II); $C_5$–$C_{10}$ cycloalkylene,

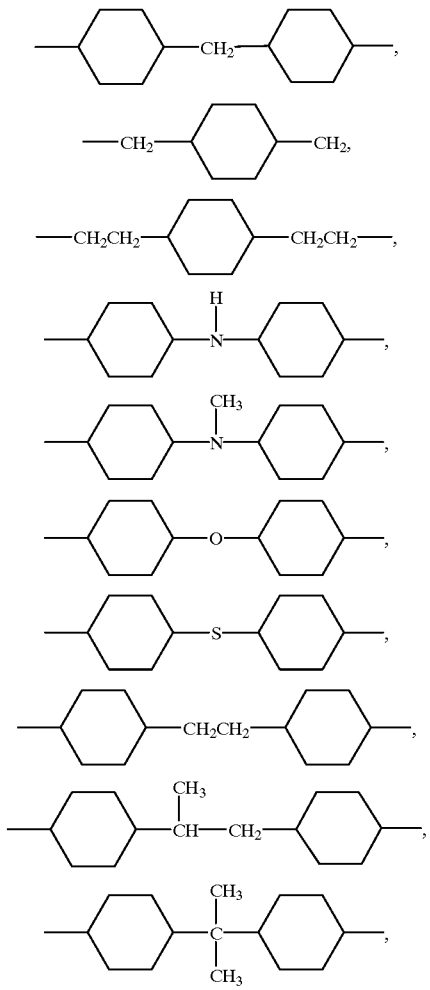

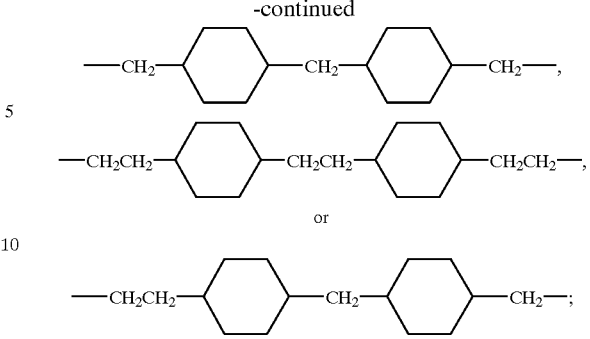

$C_6$–$C_{12}$ arylene, or $C_8$–$C_{14}$ aralkylene; n is an integer greater than 1; and Y is a halogen atom, $C_1$–$C_8$ alkylamine, pyrrolidyl, morpholino, cyclohexylamine, or

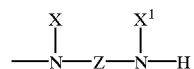

wherein $X, X^1$, and Z are as previously defined; with the proviso that at least one of X and $X^1$ is of formula (II); or is selected from the group consisting of (1) Bis(1-octyloxy-2,2,6,6,tetramethyl-4-piperdinyl) sebacate;

(2) dimethyl succinate polymer with 4-hydroxy-2,2,6,6-tetramethyl-1-piperidineethanol;

(3) a blend of dimethyl succinate polymer with 4-hydroxy-2,2,6,6-tetramethyl-1 -piperidineethanol and N,N'-bis(2,2,6,6-tetramethyl-4-piperidinyl)-1,6-hexane diamine polymer with 2,4,6-trichloro-1,3,5-triazine and 2,4,4-trimethyl-1,2-pentamine;

(4) 1,3,5-triazine-2,4,6-triamine,N,N'''[1,2-ethanediylbis [[[(4,6-bis[butyl(1,2,2,6,6-pentamethyl-4-piperidinyl) amino]-1,3,5-triazine-2-yl]imino]-3,1pr opanediyl]]-bis [N'N''-dibutyl-N',N''-bis(1,2,2,6,6-pentamethyl-4-piperidinyl), 1,3,5-triazine-2,4,6-triamine,N,N'''[1,2-ethanediylbis [[[(4,6-bis[butyl(1-cyclohexyloxy-2,2,6,6-tetraamethyl -4-piperidinyl)amino]1,3,5-triazine-2-yl] imino]-3,1-propanediyl]]-bis[N'N''-dibutyl-N',N''-bis (1,2,2,6,6-pentamethyl-4-piperidinyl), 1,3,5-triazine-2,4, 6-triamine,N,N'''[1,2-ethanediylbis [[[(4,6-bis[butyl(1,2, 2,6,6-pentamethyl-4-piperidinyl)amino]-2-yl]imino]-3, 1propanediyl]]-bi s[N'N''-dibutyl-N',N''-bis (1,2,2,6,6-pentamethyl-4-piperidinyl);

(5) N,N'-bis(2,2,6,6-tetramethyl-4piperidinyl)-1,6-hexane diamine polymer with 2,4,6-trichloro-1,3,5-triazine and 2,4,4-trimethyl-1,2-pentamine;

(6) poly-methylpropyl-3-oxy-(4(2,2,6,6-tetramethyl) piperidinyl) siloxane;

(7) poly-methylpropyl-3-oxy-(4(1,2,2,6,6-pentamethyl) piperidinyl)siloxane;

(8) polyalkyl-1-oxa-diazaspirodecane products of a reaction of tetramethyl-7-oxa-3,20-diaza-21-oxo-dispiro (5,1,11, 12)heneicosane with epichlorohydrin; and (9)1,3-propanediamine,N,N''-1,2-ethanediylbis-,polymer with 2,4,6-trichloro-1,3,5-triazine, reaction products with N-butyl-2,2,6,6-tetramethyl4piperidinamine.

22. A light stabilization additive concentrate, comprising from about 30 to about 98 percent by weight of a polymeric resin, at least one ortho hydroxy tris-aryl triazine light absorber and at least one oligomeric, polymeric, or high molecular weight HALS having a weight average molecular weight of at least about 500, wherein the weight ratio of HALS to triazine light absorber is from about 3:1 to about 20:1, and wherein the HALS is an oligomer of formula (I)

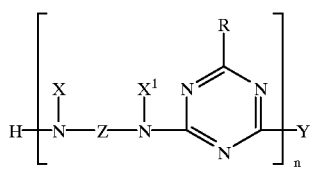

wherein R is morpholino, $C_1$–$C_8$ alkylamine, di($C_1$–$C_8$) allylamine, pyrrolidyl, or cyclohexylamine, X and $X^1$, which are the same or different, and are hydrogen, $C_1$–$C_{20}$ alkyl, or a radical of formula (II)

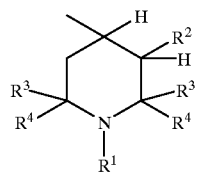

wherein $R_1$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, are the same or different, and are $C_1$–$C_8$ alkyl, benzyl, or phenethyl, or form a $C_5$–$C_{10}$ cycloalkyl; Z is a straight chained or branched $C_2$–$C_{20}$ alkylene or a straight chained or branched $C_2$–$C_{20}$ alkalene chain interrupted by at least oxy, thio, or

radical, wherein $R^5$ is hydrogen, $C_1$–$C_{20}$ alkyl, or the radical of formula (II); $C_5$–$C_{10}$ cycloalkylene,

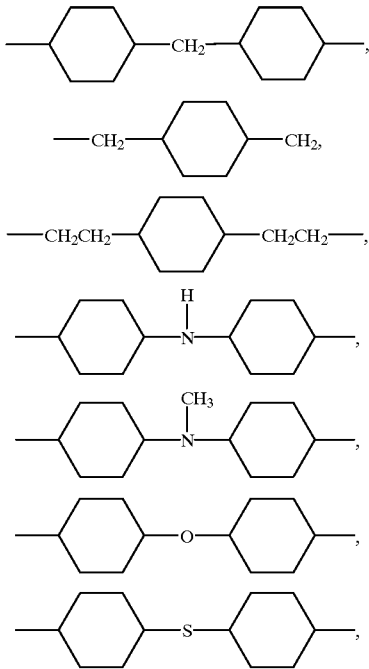

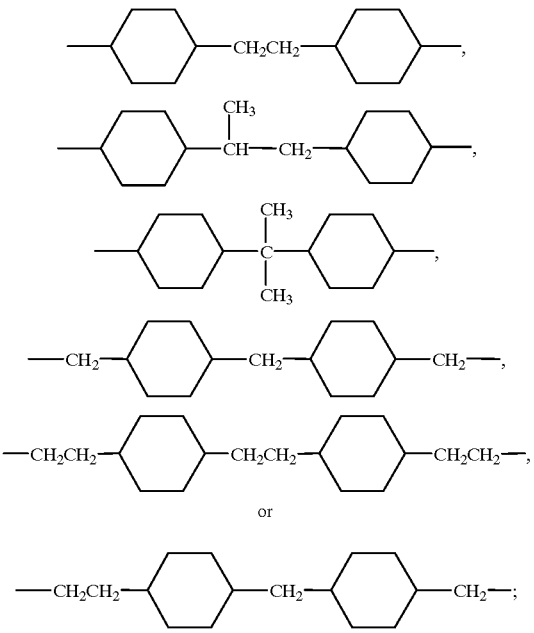

$C_6$–$C_{12}$ arylene, or $C_8$–$C_{14}$ aralkylene; n is an integer greater than 1; and Y is a halogen atom, $C_1$–$C_8$ alkylamine, di($C_1$–$C_8$) alkylamine, pyrrolidyl, morpholino, cyclohexylamine, or

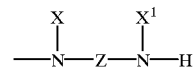

wherein X, $X^1$, and Z are as previously defined; with the proviso that at least one of X and $X^1$ is of formula (II); or is selected from the group consisting of (1) Bis(1-octyloxy-2,2,6,6,tetramethyl-4-piperdinyl) sebacate;

(2) dimethyl succinate polymer with 4-hydroxy-2,2,6,6-tetramethyl-1-piperidineethanol;

(3) a blend of dimethyl succinate polymer with 4-hydroxy-2,2,6,6-tetramethyl-1-piperidineethanol and N,N'-bis(2,2,6,6-tetramethyl-4-piperidinyl)- 1,6-hexane diamine polymer with 2,4,6-trichloro-1,3,5-triazine and 2,4,4-trimethyl-1,2-pentamine;

(4) 1,3,5-triazine-2,4,6-triamine,N,N'"[1,2-ethanediylbis [[[(4,6-bis[butyl(1,2,2,6,6-pentamethyl-4-piperidinyl) amino]-1,3,5-triazine-2-yl]imino]-3,1pr opanediyl]]-bis [N'N"-dibutyl-N',N"-bis(1,2,2,6,6-pentamethyl-4-piperidinyl), 1,3,5-triazine-2,4,6-triamine,N,N'[1,2-ethanediylbis [[[(4,6-bis[butyl(1-cyclohexyloxy-2,2,6,6-tetraamethyl -4-piperidinyl)amino]-1,3,5-triazine-2-yl] imino]-3,1-propanediyl]]-bis[N'N"-dibutyl-N',N"-bis (1,2,2,6,6-pentamethyl4-piperidinyl), 1,3,5-triazine-2,4, 6-triamine,N,N'"[1,2-ethanediylbis [[[(4,6-bis[butyl(1,2,2,6,6-pentamethyl-4-piperidinyl)amino]-2-yl]imino]-3,1propanediyl]]s[N'N"-dibutyl-N',N"-bis (1,2,2,6,6-pentamethyl-4-piperidinyl);

(5) N,N'-bis(2,2,6,6-tetramethyl-4-piperidinyl)-1,6-hexane diamine polymer with 2,4,6-trichloro-1,3,5-triazine and 2,4,4-trimethyl-1,2-pentamine;

(6) poly-methylpropyl-3-oxy-(4(2,2,6,6-tetramethyl) piperidinyl) siloxane;

(7) poly-methylpropyl-3-oxy-(4(1,2,2,6,6-pentamethyl) piperidinyl)siloxane;

(8) polyalkyl-l-oxa-diazaspirodecane products of a reaction of tetramethyl-7-oxa-3,20-diaza-21-oxo-dispiro (5,1,11,12)heneicosane with epichlorohydrin; and (9) 1,3-propanediamine,N,N"- 1 ,2-ethanediylbis-,polymer with 2,4,6-trichioro- 1,3,5-triazine, reaction products with N-butyl-2,2,6,6-tetramethyl-4-piperidinamine.

23. The light stabilization additive concentrate of claim 22, wherein the additive concentrate is in the form of pellets, prills, or pastilles.

24. The light stabilization additive concentrate of claim 22, wherein the resin is present in an amount from about 50 to about 95 percent by weight.

25. A method of forming a stabilized polymeric article, comprising blending a polymeric material with from about 50 to about 5,000 ppm of at least one ortho hydroxy tris-aryl triazine light absorber and from about 500 ppm to about 1.25 percent of at least one oligomeric, polymeric, o:r high molecular weight HALS having a weight average molecular weight of at least about 500, wherein the weight ratio of HALS to triazine light absorber is from about 3:1 to about 20:1, to form a stabilized polymeric composition, and forming an extruded or molded article or a biaxially oriented tape or film from the stabilized polymeric composition, and wherein th HALS is an oligomer of formula (I)

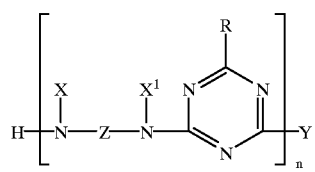

wherein R is morpholino, $C_1$–$C_8$ alkylamine, di($C_1$–$C_8$) alkylamine, pyrrolidyl, or cyclohexylamine, X and $X^1$, which are the same or different, and are hydrogen, $C_1$–$C_{20}$ alkyl, or a radical of formula (II)

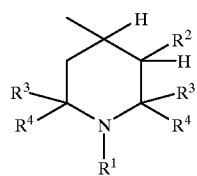

wherein $R^5$ represents hydrogen, $C_2$–$C_3$ hydroxyalkyl, $C_1$–$C_8$ alkyl, hydroxyl, or oxyl; $R^2$ represents hydrogen, $C_1$–$C_8$ alkyl, or benzyl; $R^3$ and $R^4$, are the same or different, and are $C_1$–$C_8$ alkyl, benzyl, or phenethyl, or form a $C_5$–$C_{10}$ cycloalkyl; Z is a straight chained or branched $C_2$–$C_{20}$ alkylene or a straight chained or branched $C_2$–$C_{20}$ alkalene chain interrupted by at least oxy, thio, or

radical, wherein $R^5$ is hydrogen, $C_1$–$C_{20}$ alkyl, or the radical of formula (II); $C_5$–$C_{10}$ cycloalkylene,

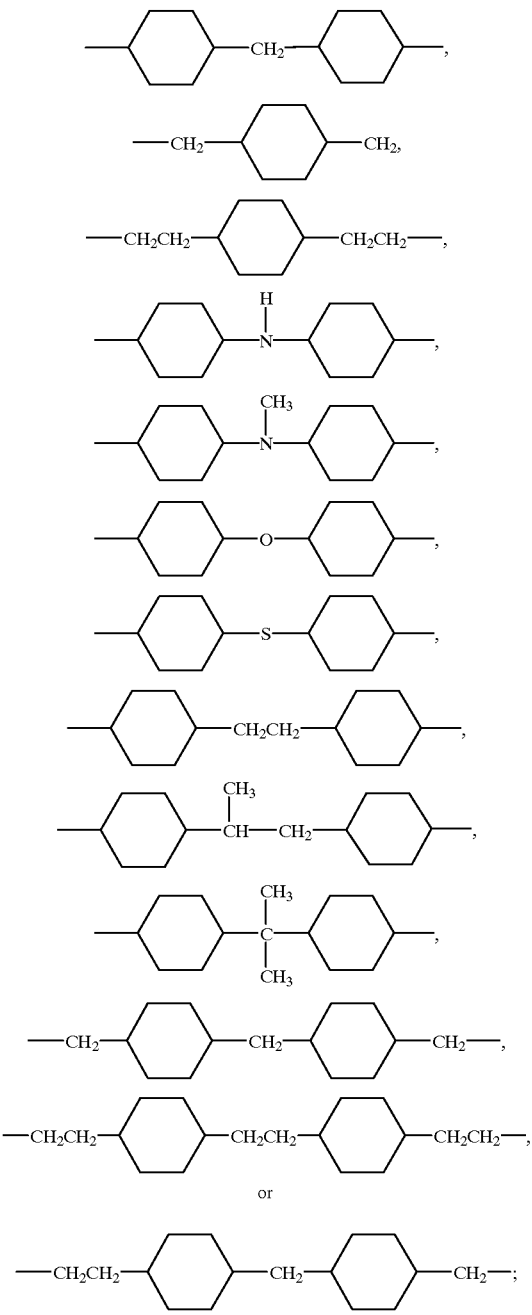

$C_6$–$C_{12}$ arylene, or $C_8$–$C_{14}$ aralkylene; n is an integer greater than 1; and Y is a halogen atom, $C_1$–$C_8$ alkylamine, di($C_1$–$C_8$ ) alkylamine, pyrrolidyl, morpholino, cyclohexylamine, or

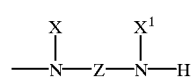

wherein X, $X^1$, and Z are as previously defined; with the proviso that at least one of X and $X^1$ is of formula (II); or is selected from the group consisting of (1) Bis(1-octyloxy-2,2,6,6,tetramethyl-4-piperdinyl) sebacate;

(2) dimethyl succinate polymer with 4-hydroxy-2,2,6,6-tetramethyl-1-piperidineethanol;
(3) a blend of dimethyl succinate polymer with 4-hydroxy-2,2,6,6-tetramethyl-1-piperidineethanol and N,N'-bis(2,2,6,6-tetramethyl-4-piperidinyl)-1,6-hexane diamine polymer with 2,4,6-trichloro-1,3,5-triazine and 2,4,4-trimethyl-1,2-pentamine;
(4) 1,3,5-triazine-2,4,6-triamine,N,N'[1,2-ethanediylbis [[[(4,6-bis[butyl(1 ,2,2,6,6-pentamethyl-4-piperidinyl) amino]-1,3,5-triazine-2-yl]imino]-3,1pr opanediyl]]-bis [N'N"-dibutyl-N',N"-bis(1,2,2,6,6-pentamethyl-4-piperidinyl), 1,3,5-triazine-2,4,6-triamine,N,N'"[1,2-ethanediylbis [[[(4,6-bis[butyl(1-cyclohexyloxy-2,2,6,6-tetraamethyl -4-piperidinyl)amino]-1,3,5-triazine-2-yl] imino]-3,1-propanediyl]]-bis[N'N"-dibutyl-N',N"-bis (1,$^2$,$^2$,6,6-pentamethyl-4-piperidinyl), 1,3,5-triazine-2,4, 6-triamine,N,N"'1,2-ethanediylbis [[[(4,6-bis[butyl(1,2,2, 6,6-pentamethyl-4-piperidinyl)amino]-2-yl]imino]-3,1 propanediyl]]-bi s[N'N"-dibutyl-N',N"-bis (1,2,2,6,6-pentamethyl-4-piperidinyl);
(5) N,N'-bis(2,2,6,6-tetramethyl-4-piperidinyl)-1,6-hexane diamine polymer with 2,4,6-trichloro-1,3,5-triazine and 2,4,4-trimethyl-1,2-pentamine;
(6) poly-methylpropyl-3-oxy-(4(2,2,6,6-tetramethyl) piperidinyl) siloxane;
(7) poly-methylpropyl-3-oxy-(4(1,2,2,6,6-pentamethyl) piperidinyl)siloxane;
(8) polyalkyl-1-oxa-diazaspirodecane products of a reaction of tetramethyl-7-oxa-3,20-diaza-21-oxo-dispiro (5,1,11, 12)heneicosane with epichlorohydrin; and
(9) 1,3-propanediamine,N,N"-1,2-ethanediylbis-,polymer with 2,4,6-trichloro-1,3,5-triazine, reaction products with N-butyl-2,2,6,6-tetramethyl-4-piperidinamine.

26. The method of claim 25, further comprising adding the at least one ortho hydroxy tris-aryl triazine light absorber and the at least one oligomeric, polymeric, or high molecular weight HALS in the form of an additive composition comprising at least one ortho hydroxy tris-aryl triazine light absorber and at least one oligomeric, polymeric, or high weight average molecular weight HALS having a molecular weight of at least about 500, wherein the weight ratio of HALS to triazine light absorber is from about 3:1 to about 20:1.

27. The method of claim 26, further comprising forming the additive composition by melting the at least one ortho hydroxy tris-aryl triazine light absorber and the at least one oligomeric, polymeric, or high molecular weight HALS together to form a mixture, and extruding the mixture.

28. The method of claim 26, further comprising forming the additive composition by spraying solutions of the light absorber and HALS.

29. The method of claim 26, further comprising forming the additive composition by physical compaction.

30. The method of claim 25, further comprising molding or extruding a polymeric article having a thickness of no less than about 1 mm.

31. The light stabilization additive composition of claim 21 further comprising a solvent.

32. A polymeric composition comprising the light stabilization additive composition of claim 21 and a polyurethane.

33. The polymeric composition of claim 32 further comprising a solvent.

* * * * *

UNITED STATES PATENT AND TRADEMARK OFFICE
CERTIFICATE OF CORRECTION

PATENT NO. : 6,051,164

DATED : April 18, 2000

INVENTOR : Sari-Beth Samuels

It is certified that error appears in the above-identified patent and that said Letters Patent is hereby corrected as shown below:

Column 14, line 3: after "molecular" insert --weight--.

Column 23, Claim 25, line 5: change "o:r" to --or--.

Column 23, Claim 25, line 12: delete "th" and insert --the--.

Signed and Sealed this

Twentieth Day of March, 2001

Attest:

NICHOLAS P. GODICI

*Attesting Officer*  *Acting Director of the United States Patent and Trademark Office*